(12) United States Patent
Bucks et al.

(10) Patent No.: US 12,076,803 B2
(45) Date of Patent: *Sep. 3, 2024

(54) METHOD OF MANUFACTURING RECIPROCATING SAW BLADE

(71) Applicant: BLACK & DECKER INC., New Britain, CT (US)

(72) Inventors: Brent L. Bucks, Lakewood Ranch, FL (US); Jeremy A. Lowder, Shelbyville, KY (US)

(73) Assignee: BLACK & DECKER INC., New Britain, CT (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/560,528

(22) Filed: Dec. 23, 2021

(65) Prior Publication Data

US 2022/0111454 A1    Apr. 14, 2022

Related U.S. Application Data

(63) Continuation of application No. 16/886,318, filed on May 28, 2020, now Pat. No. 11,241,748, which is a
(Continued)

(51) Int. Cl.
*B23D 61/12*  (2006.01)
*B23D 65/02*  (2006.01)

(52) U.S. Cl.
CPC ......... *B23D 61/121* (2013.01); *B23D 61/126* (2013.01); *B23D 61/128* (2013.01);
(Continued)

(58) Field of Classification Search
CPC .... B23D 1/121; B23D 61/126; B23D 61/128; B23D 65/026; B23D 61/121; B23D 65/02; Y10T 83/9319; Y10T 83/936
(Continued)

(56) References Cited

U.S. PATENT DOCUMENTS

| 349,143 A | 9/1886 | Clemson |
| 1,390,400 A | 9/1921 | Threet |

(Continued)

FOREIGN PATENT DOCUMENTS

| DE | 1503939 A1 | 9/1969 |
| DE | 8805767 U1 | 6/1988 |

(Continued)

*Primary Examiner* — Ghassem Alie
(74) *Attorney, Agent, or Firm* — Scott B. Markow

(57) ABSTRACT

A method of manufacturing a reciprocating saw blade includes forming a body with a shank end configured to secure the blade with a reciprocating saw, a plunging end configured to enter a workpiece, and a cutting edge and opposite back edge extending between the shank end and the plunging end. The cutting edge is formed to include a plurality of teeth arranged in a repeating pattern that includes left set teeth and right set teeth, the plurality of additional teeth being substantially the same size as each other and as the third tooth, wherein the plurality of additional gullets are substantially the same size as each other, and wherein the enlarged first gullet is longer in an axial direction than each of the plurality of additional gullets.

20 Claims, 4 Drawing Sheets

Related U.S. Application Data continuation of application No. 15/045,529, filed on Feb. 17, 2016, now Pat. No. 10,702,934, which is a continuation of application No. 12/261,186, filed on Oct. 30, 2008, now abandoned.

(60) Provisional application No. 61/007,232, filed on Dec. 11, 2007.

(52) U.S. Cl.
CPC .......... B23D 65/02 (2013.01); *Y10T 83/9319* (2015.04); *Y10T 83/936* (2015.04)

(58) Field of Classification Search
USPC ............. 83/835, 846–855; 30/355, 392–394; D8/20
See application file for complete search history.

(56) References Cited

U.S. PATENT DOCUMENTS

| | | |
|---|---|---|
| 1,876,945 A | 9/1932 | Hutchings |
| 2,646,094 A | 7/1953 | Russell |
| 2,890,728 A | 6/1959 | Craven |
| 2,916,066 A | 12/1959 | Morse |
| 3,033,251 A | 5/1962 | Atkinson et al. |
| 3,061,927 A | 11/1962 | Und |
| 3,111,970 A | 11/1963 | Lou et al. |
| 3,357,462 A | 12/1967 | Craven |
| 3,477,479 A | 11/1969 | Doty |
| 3,964,163 A | 6/1976 | Russo |
| 4,027,390 A | 6/1977 | Kendzior |
| 4,802,396 A * | 2/1989 | Kuklinski ............ B23D 61/121 83/849 |
| 5,119,708 A * | 6/1992 | Musgrove ............ B23D 61/128 83/835 |
| 5,295,426 A | 3/1994 | Planchon |
| 5,517,889 A | 5/1996 | Logan |
| 5,848,473 A * | 12/1998 | Brandenburg, Jr. . B23D 61/121 30/514 |
| 5,855,158 A | 1/1999 | Donofrio |
| 5,884,547 A | 3/1999 | Carlsen et al. |
| 5,918,525 A | 7/1999 | Schramm |
| 6,125,544 A | 10/2000 | Eriksson et al. |
| 6,244,152 B1 | 6/2001 | Di |
| 6,427,573 B1 | 8/2002 | Carlsen et al. |
| 6,601,495 B2 | 8/2003 | Cranna |
| D482,945 S | 12/2003 | Grolimund |
| 6,782,781 B2 | 8/2004 | Rack |
| 7,127,979 B2 | 10/2006 | Kocher et al. |
| 7,174,823 B2 | 2/2007 | Cranna |
| 7,225,714 B2 | 6/2007 | Rompel et al. |
| D565,369 S * | 4/2008 | Dawson .......................... D8/20 |
| D608,611 S | 1/2010 | Lowder |
| 7,806,033 B2 | 10/2010 | Kocher et al. |
| 2002/0184988 A1 | 12/2002 | Rohman et al. |
| 2003/0010179 A1 | 1/2003 | Mcluen |
| 2003/0051593 A1 | 3/2003 | Kocher et al. |
| 2005/0211046 A1 | 9/2005 | Thomas et al. |
| 2008/0307936 A1 | 12/2008 | Elliston et al. |

FOREIGN PATENT DOCUMENTS

| | | |
|---|---|---|
| DE | 202004017351 U1 | 3/2006 |
| EP | 0786302 B2 | 4/2008 |

* cited by examiner

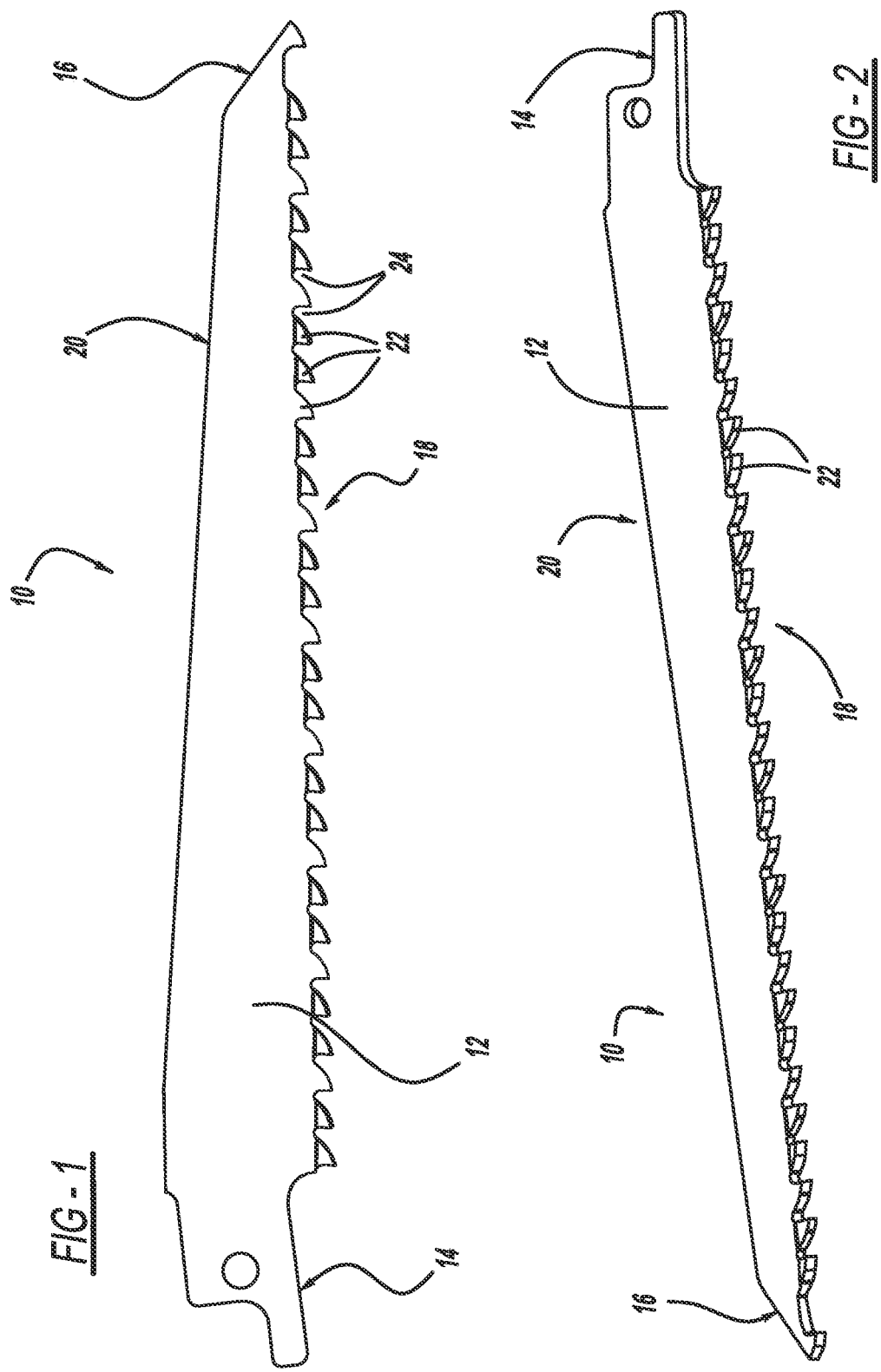

METHOD OF MANUFACTURING RECIPROCATING SAW BLADE

CROSS-REFERENCE TO RELATED APPLICATIONS

This application claims priority under 35 U.S.C. § 120 as a continuation of U.S. patent application Ser. No. 16/886,318, filed May 28, 2020, titled "Reciprocating Saw Blade with Plunge Nose," which is a continuation of U.S. patent application Ser. No. 15/045,529, filed Feb. 17, 2016, titled "Reciprocating Saw Blade with Plunge Nose," which is a continuation of U.S. patent application Ser. No. 12/261,186, filed Oct. 30, 2008, titled "Reciprocating Saw Blade with Plunge Nose," which claims the benefit of U.S. Provisional Application No. 61/007,232, filed on Dec. 11, 2007. The entire disclosure of each of these applications is incorporated herein by reference.

FIELD

The present disclosure relates to reciprocating saw blades and, more particularly, to reciprocating saw blades with a plunge nose, and to methods of manufacturing such reciprocating saw blades.

BACKGROUND

Numerous trades utilize reciprocating saws and blades to cut various objects. Plumbers utilize reciprocating saw blades to cut PVC pipe as well as to rough in holes in sub flooring. Heating and ventilating contractors utilize reciprocating saw blades to cut vents into sub flooring. Contractors utilize reciprocating saws to frame windows, doors, and the like. Also, renovation contractors utilize reciprocating saw blades to cut through nails and the like to remove walls and the like. These users rely on reciprocating saw blades that cut fast, have a desirable blade life or durability and enable easy plunge cutting that provides a fast, as well as a controlled cut. Available reciprocating saw blades that are utilized to plunge cut have a nose that, when it is plunged into the sub flooring or a workpiece, creates an enlarged inaccurate kurf. Thus, the reciprocating saw blade haphazardly bites into the workpiece. This slows the cutting process as well as provides the user with little or no control when plunging the reciprocating saw blade into the workpiece. Thus, it would be desirable to have a reciprocating saw blade that rapidly plunges into the workpiece to provide an accurate kurf while enabling fast cutting of the workpiece.

Accordingly, the present disclosure provides the art with such a reciprocating saw blade. The present reciprocating saw blade pierces the workpiece for fast and accurate plunge cutting. The present saw blade provides easy plunge cutting and provides the user with a controlled cut which, in turn, is also a fast cut. The reciprocating saw blade has an extended blade life that provides significant durability. The present reciprocating saw blade provides faster removal of swarf from the kurf. The present saw blade provides a first full raker tooth that quickly pierces the workpiece to provide faster cutting of the workpiece.

SUMMARY

In accordance with the first aspect of the disclosure, a reciprocating saw blade comprises a body with two ends and two edges. A first shanking end secures the blade with the reciprocating saw. The second end is a plunging end to enter into a workpiece. A first edge has a plurality of teeth and gullets. The second back edge opposes the first edge. The plurality of teeth has a first tooth immediately adjacent the plunging end. The first tooth is a full tooth and is also a raker tooth or unset tooth. The first tooth has a relief face angle of about 35° to 50°. A first gullet is adjacent the first tooth. The first gullet has a size at least 1.5 times the gullet size of the remaining gullets of the plurality of gullets. The gullet size is generally from 2 to 5.5 times the size of the remaining gullets of the plurality of gullets. The plunging end has an end face on an angle of about 35° to 45° with respect to a longitudinal axis of the blade. The plunging end has an end surface intersecting the first tooth to form a cutting edge. The plurality of teeth is set teeth.

Accordingly to another aspect of the disclosure, a reciprocating saw blade comprises a body with two ends and two edges. The first shanking end secures the blade with a reciprocating saw. A second plunging end is present to enter a workpiece. A first edge has a plurality of teeth and gullets. The second back edge opposes the first edge. The plurality of teeth has a first tooth immediately adjacent the plunging end. The first tooth is a full tooth and is also a raker or unset tooth. The first tooth has a relief face angle of about 35° to 50°. The remainder of the plurality of teeth have substantially the same size, also the gullets have substantially the same size. One tooth immediately adjacent the first tooth of the plurality of teeth is missing from the plurality of teeth forming a gap between the first tooth and the plurality of teeth. Two teeth of the plurality of teeth may be missing forming a larger gap. The plunging end has an end surface on an angle of about 35° to 45° with respect to the longitudinal axis of the blade. The plunging end has an end surface intersecting the first tooth to form a cutting edge. The plurality of teeth is set teeth.

Accordingly to a third aspect of the disclosure, a method for manufacturing a reciprocating saw blade comprises forming a plurality of teeth into a coil stock. The coil stock is fed into a die set. Teeth on the coil stock are located in the die set. A portion of the teeth on the coil stock is flattened. A first tooth and a first gullet of a reciprocating saw blade and a third tooth are formed into the flattened portion of the coil stock. The reciprocating saw blade is formed with a first tooth and a first gullet with the first gullet being enlarged with respect to the remaining gullets of a plurality of gullets. The flattening step includes flattening at least three teeth of the plurality of teeth. The coil stock is punched to form the first tooth and the first gullet of the saw blade. The teeth are milled and set into the coil stock. The set teeth are flattened to form the first tooth as a raker or unset tooth. The first gullet has size 1.5 to 5.5 times the size of the remaining gullets of the plurality of gullets.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a side elevational view of a reciprocating saw blade in accordance with the present disclosure.

FIG. 2 is a perspective view of FIG. 1 rotated approximately 90°.

DETAILED DESCRIPTION

Figure 3:
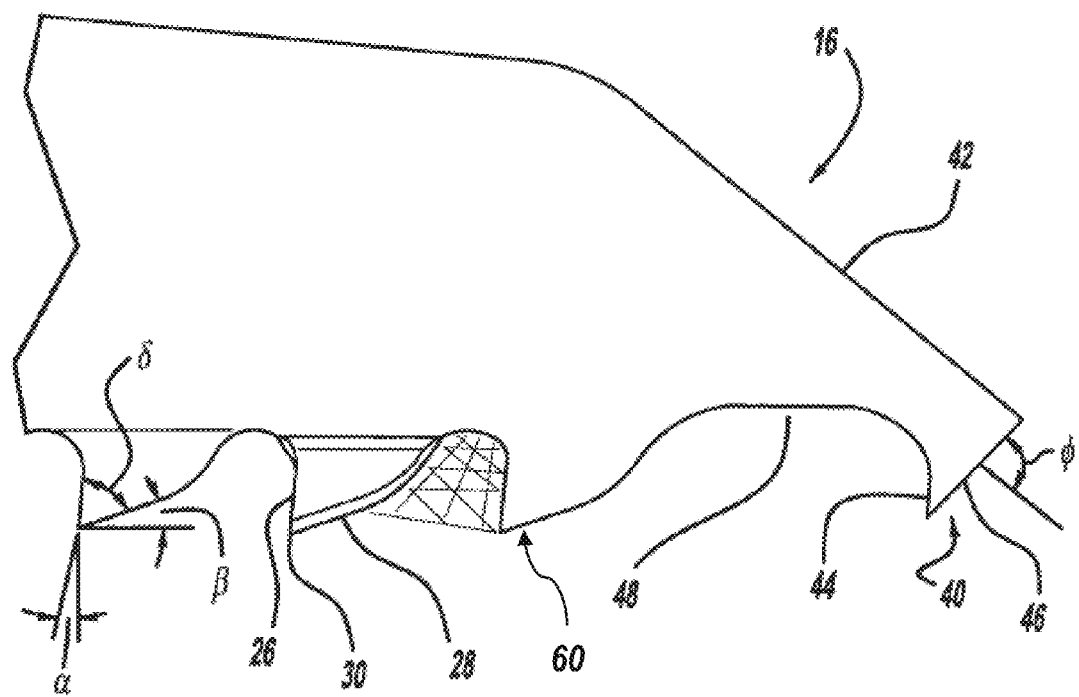
FIG. 3 is an enlarged elevational view of the nose of FIG. 1.
Figure 4:
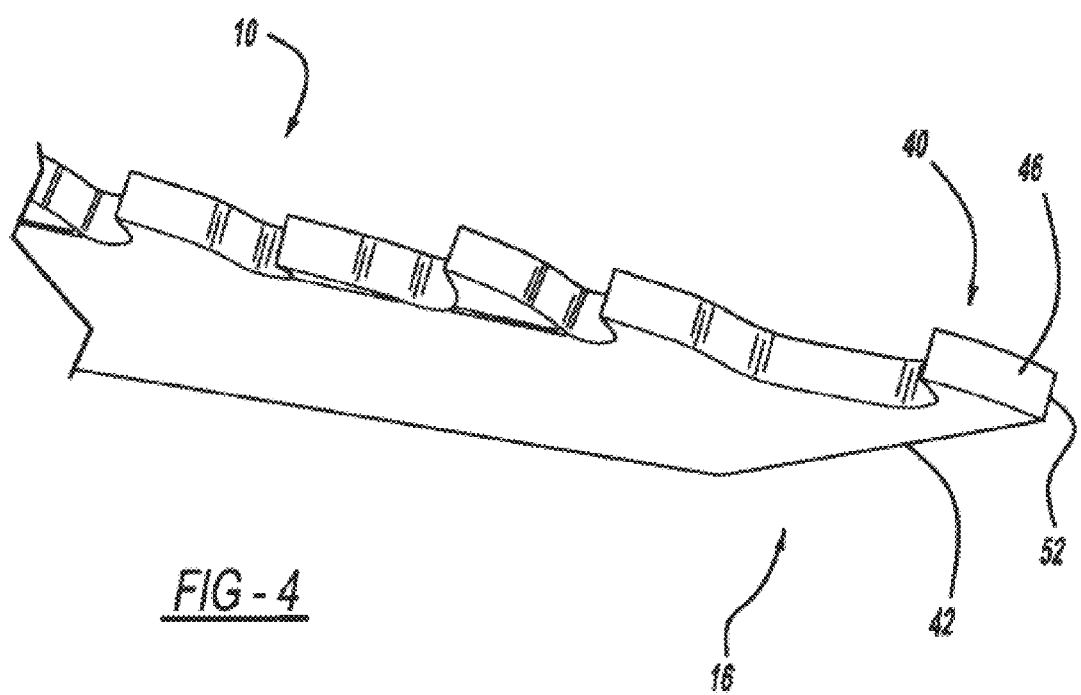
FIG. 4 is a view like FIG. 3 rotated approximately 90°.

The following description is merely exemplary in nature and is not intended to limit the present disclosure, application, or uses.

Turning to the figures, particularly FIG. 1, a reciprocating saw blade is illustrated and designated with the reference numeral 10. The reciprocating saw blade 10 includes a body 12 which has a first shanking end 14 and a plunging nose end 16. The body 12 includes two edges. The first edge is a cutting edge 18 and the second edge is an opposing back edge 20. The cutting edge 18 includes a plurality of teeth 22. Each tooth includes a gullet 24. The gullets 24 are substantially identical and all have substantially the same size. Additionally, the teeth 22 are substantially identical and all have substantially the same size. Also, the teeth 22 are set teeth alternating left and right, separated by a raker, left, right. The left and right set can be alternated to provide a desired saw blade. The set of the teeth provides spacing for the body 12 and clearance for the back edge so that it can be maneuvered through the created kurf.

The plurality of teeth 22 includes a rake face 26 and a relief face 28. The rake face 26 and relief face 28 intersect one another to form a cutting edge 30. The rake face 26 is preferably at a rake angle α of about 3° to 10°. The relief face 28 is at a relief angle ß from about 15° to 35°. The tooth 22 has an included angle δ of about 45° to about 72°.

The gullets 24 have a desired volume as illustrated in the shaded area of FIG. 3. The volume of each of the gullets 24 is substantially the same for all of the gullets 24.

The plunging end 16 has a first tooth 40 adjacent the end surface 42 of the plunging nose 16. The tooth 40 is a full tooth and is also a raker or unset tooth. The tooth 40 has substantially the same rake face 44 and rake angle as that previously discussed. A relief surface 46 is formed on the plunging end by removing a portion of the first tooth on a relief angle D from about 35° to about 50° so that the first tooth has a somewhat different configuration than the other teeth. Preferably, the relief angle is about 45°. The first tooth 40 may be offset toward the back edge 20 from a line through the cutting edges 30 to about 0.25 mm. This insures a sharp cutting edge on the first tooth 40.

A first gullet 48 is positioned adjacent the rake face 44. The first gullet 48 has a size from 1.5 to 5.5 times, preferably 2 to 5.5 times, the size of the remaining gullets 24. Thus, an enlarged gullet 48 is formed between the first tooth 40 and the remainder of the plurality of teeth 22. A second tooth has been removed or is missing from the plurality of teeth 22 to form the gap which creates the first gullet 48. Thus, by removing a tooth, this allows the first tooth 40 to cut into the workpiece so the third tooth 60 (first tooth of the remainder of the plurality of teeth 22) cannot engage or alter the path of the first tooth. Additionally, the third tooth 60 is preferably a raker or straight tooth This provides for a straight groove cut into the workpiece that is not influenced by the set plurality of teeth 22. Also, by having the first tooth 40 and a larger gullet, faster and greater chip removal is provided as well as an increased cutting speed.

The end surface 42 of the plunge nose 16 is on an angle of 35° to 45° and preferably 39° with respect to the longitudinal axis of the blade. This aggressive angle provides for clearance of the plunge nose 16 to enable it to plunge faster into the workpiece. Also, the end surface 42 intersects the relief surface 46 of the first tooth to form a cutting edge 52 at the tip of the blade. An included angle of about 60° to 90° is formed between the end surface 42 and relief surface 46. This enhances the chipping action of the reciprocating saw blade 10 once the saw blade enters into the kurf of the workpiece.

Figure 5:
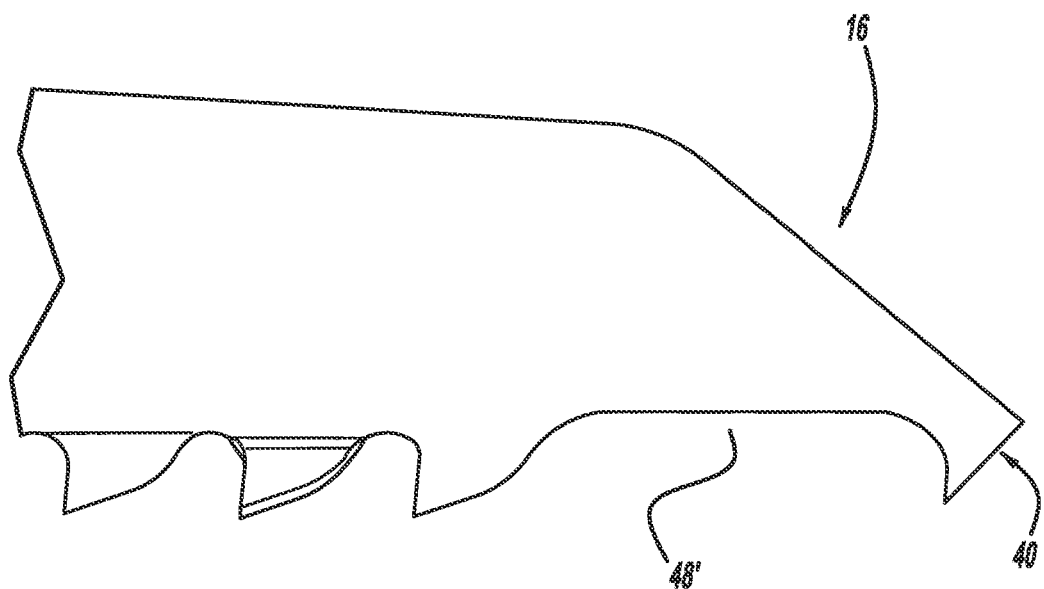
FIG. 5 is an elevational view of an additional embodiment of the present invention.

FIG. 5 illustrates a second embodiment. Here, the saw blade is the same as that previously disclosed; however, two teeth are missing out of the plurality of teeth behind the first tooth 40. This provides an even larger first gullet 48' about 5.5 times the size of the remaining gullets. This enables the fast removal of chips to provide a faster cutting reciprocating saw blade.

Figure 6:
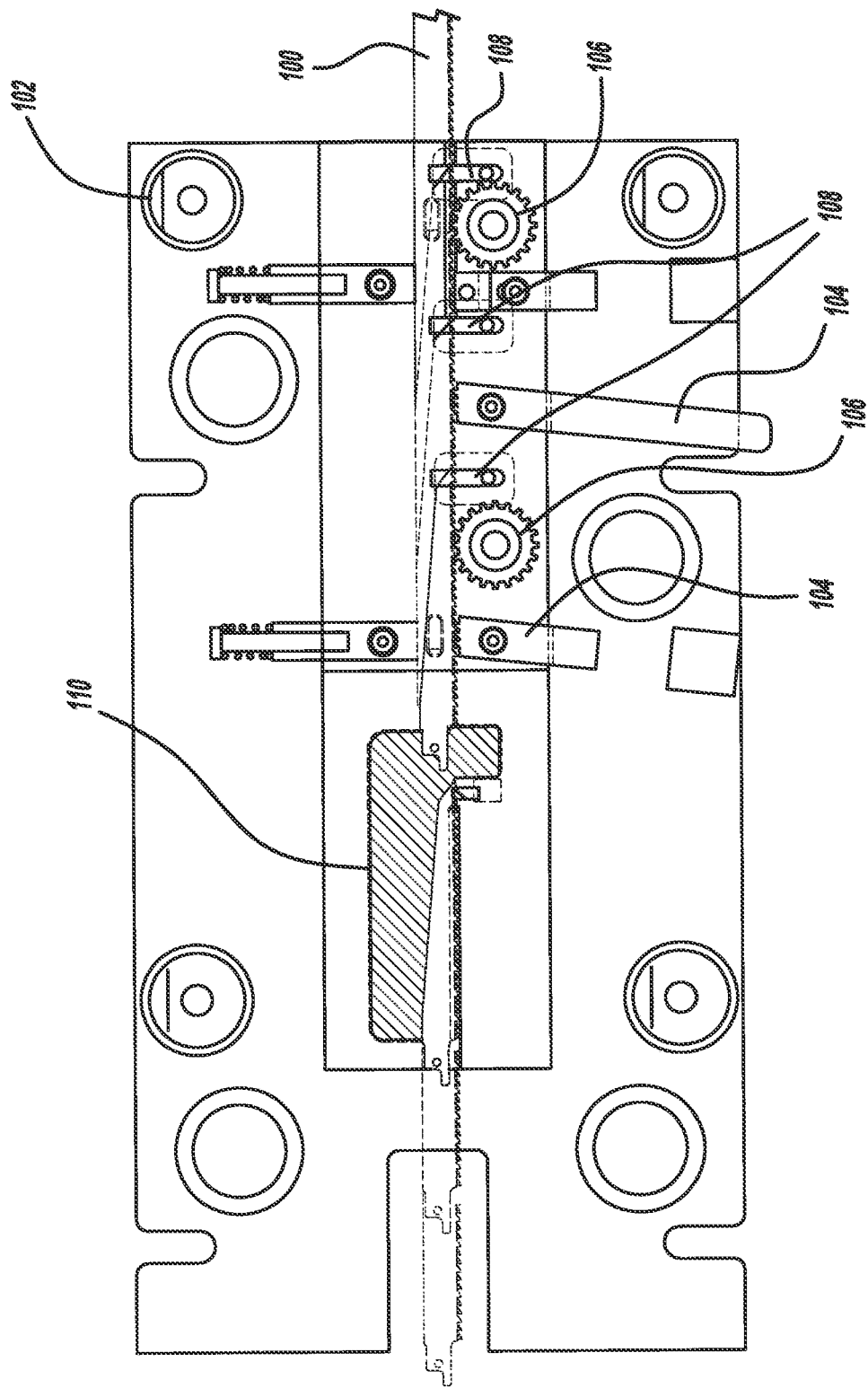
FIG. 6 is a schematic view of a method of manufacturing a saw blade.

Turning to FIG. 6, a method for manufacturing the blades is illustrated. Here, a stock coil 100 is fed into a die set 102. The coil stock 100 has had the teeth milled and set into the coil. The coil is unwound to have the teeth milled and set and then rewound after the teeth have been milled and set into the coil stock 100. The coil stock 100 is then fed into the die set 102. As the coil stock 100 enters the die set 102, the teeth 22 are located by a pilot stop 104. Two pilot stops 104 are illustrated which may be used on different size reciprocating saw blades. Since the die set 102 may be utilized to stamp 6", 9" and 12" blades, only one die set 102 is needed to manufacture all three sizes. Rollers 106 advance the coil stock 100 into the die set 102. The pilot stops 104 locate the teeth and continue with the coil stock 100 into the die set. Coil stock 100 is stopped to enable a punch 108 to flatten at least three teeth of the teeth. The flattening occurs by compressing the punch together to provide a region that now has no defined tooth set but a straight flat portion. The coil stock 100 continues to be fed into dies 110. As the coil stock 100 is positioned into the dies 110 with the fattened portion at the end of the dies 110. The dies 110 are closed and a punch progression begins to form the first tooth 40 as well as the enlarged gullet 48 into the flattened portion of coil stock to form the saw blade. Also, as this occurs, the coil stock 100 is continuously fed into an opening into the die 110 which forms the shanking end of the next reciprocating blade. It should be noted that the flattening, forming of the first tooth and enlarged gullet, as well as the forming of the shank end, takes place simultaneously in the die set at different locations along the die set. After the punching, the blade 10 exits the die set 102 with a first tooth and gullet as well as the plurality of teeth as explained above.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A method of manufacturing a reciprocating saw blade comprising:

forming a body that extends generally along an axis with a shank end portion configured to secure the blade with a powered saw, a front end configured to enter a workpiece, a cutting edge extending between the shank end portion and the front end, and a back edge opposite the cutting edge and extending between the shank end portion and the front end; and forming the cutting edge to include an unset first tooth immediately adjacent the front end, an unset third tooth following the first tooth toward the shank end portion, an enlarged front gullet between the first tooth and the third tooth, and a plurality of additional teeth and a plurality of additional gullets following the third tooth toward the shank end portion, wherein the plurality of additional teeth are arranged in a repeating pattern that includes left set teeth and right set teeth, the plurality of additional teeth being substantially the same size as each other and as the third tooth, wherein the plurality of additional gullets are substantially the same size as each other, and wherein the enlarged first gullet is longer in an axial direction than each of the plurality of additional gullets.

2. The method of claim 1, wherein forming the body comprises forming the body from a piece of coil stock that has a plurality of teeth and a plurality of gullets each with substantially the same size as the plurality of additional teeth and plurality of additional gullets.

3. The method of claim 2, further comprising forming the enlarged front gullet by removing at least a portion of a second tooth between the first tooth and the third tooth from the body.

4. The method of claim 3, further comprising removing an entirety of the second tooth from the body.

5. The method of claim 1, wherein the enlarged gullet is approximately 1.5 to 5.5 times as long as the plurality of gullets.

6. The method of claim 1, wherein the enlarged gullet is approximately twice as long as the plurality of gullets.

7. The method of claim 1, further comprising forming a relief face at a relief angle of about 35° to 50° to the axis on the first tooth.

8. The method of claim 1, further comprising forming an end surface on the front tooth intersecting the first tooth to define a cutting edge.

9. The method of claim 1, further comprising forming at least a portion of the back edge to be non-parallel to the cutting edge.

10. The method of claim 1, wherein the repeating pattern further includes unset teeth.

11. A method of manufacturing a reciprocating saw blade comprising:

forming a body extending generally along an axis with a shank end portion configured to secure the blade with a powered saw, a front end configured to enter a workpiece, a cutting edge extending between the shank end portion and the front end, and a back edge opposite the cutting edge and extending between the shank end portion and the front end; and forming the cutting edge to include an unset front tooth immediately adjacent the front end and a plurality of additional teeth following the front tooth toward the shank end portion, wherein the plurality of additional teeth includes an unset leading tooth closest to the front tooth and a plurality of left set teeth and right set teeth following the leading tooth toward the shank end portion, the plurality of additional teeth each being substantially the same size as each other and separated from each other by a plurality of additional gullets so that the additional teeth are spaced apart from each other by a first distance, and wherein the front tooth is spaced apart from the leading tooth by an enlarged gullet so that the front tooth is spaced apart from the leading tooth by a second distance that is greater than the first distance.

12. The method of claim 11, wherein forming the body includes forming the body from a piece of coil stock that has a plurality of teeth and a plurality of gullets each having substantially the same size as the plurality of additional teeth and plurality of additional gullets.

13. The method of claim 12, further comprising forming the enlarged gullet by removing at least a portion of an intermediate tooth between the front tooth and the leading tooth from the body.

14. The method of claim 13, further comprising removing an entirety of the intermediate tooth from the body.

15. The method of claim 11, wherein the enlarged gullet is approximately 1.5 to 5.5 times as long as the plurality of additional gullets.

16. The method of claim 11, wherein the enlarged gullet is approximately twice as long as the plurality of additional gullets.

17. The method of claim 11, further comprising forming a relief face at a relief angle of about 35° to 50° to the axis on the front tooth.

18. The method of claim 11, further comprising forming an end surface intersecting the front tooth to define a cutting edge.

19. The method of claim 11, further comprising forming at least a portion of the back edge to be non-parallel to the cutting edge.

20. The method of claim 11, wherein the plurality of additional teeth includes a plurality of unset teeth.

* * * * *